United States Patent Office 2,938,878
Patented May 31, 1960

2,938,878

VINYL CHLORIDE RESIN COMPOSITIONS CONTAINING AN ALKYL N,N-BIS (2-CYANOETHYL) CARBOXAMATE AS A PLASTICIZER

Theodore E. Mullen, South Charleston, W. Va., assignor to Union Carbide Corporation, a corporation of New York No Drawing. Filed July 31, 1953, Ser. No. 371,723

9 Claims. (Cl. 260—31.2)

This invention relates to plasticized compositions and has for an object the provision of an improved type of plasticized composition. More particularly, this invention is directed to a polyvinyl resin composition containing as a plasticizer an alkyl N,N-bis(2-cyanoethyl)-carboxamate.

As a rule, polyvinyl resins are generally too hard and rigid to be used for many purposes without a modifier, commonly referred to as a plasticizer. It is usually necessary to add a plasticizer to make the resins soft, pliable and capable of being formed into strong pliable sheets or films. It is also necessary that the plasticized resin composition have excellent heat stability, suppleness and elasticity. In order for a material to act as a plasticizer, it is necessary that it be compatible with the resin and not exude or sweat out leaving the resin unplasticized.

The plasticizers of my invention are useful in plasticizing the polyvinyl resins such as, for example, the vinyl chloride-vinyl acetate copolymer resins, the vinyl chloride-vinyl acetate-vinyl alcohol resins, the vinyl acetate resins, the vinyl chloride resins, the ter-polymer of vinyl chloride-vinyl acetate and maleic acid, the ter-polymers of vinyl chloride-acrylonitrile and vinyl acetate and the vinyl chloride-acrylonitrile resins.

A more specific aspect of my invention comprises the plasticized compositions of vinyl chloride-acrylonitrile copolymer resins.

Acrylonitrile polymers are, as a class, extremely difficult to fabricate by processes involving resin flow at elevated temperatures. They are not amenable to plasticization, and their troublesome solubility characteristics have often discouraged the development of solution processes. Thus, the utility of the acrylonitrile polymers was limited to the field of fibers but now the new plasticized composition of my invention permits the use of acrylonitrile polymers in such fields as coatings, molded articles, films, and calendered sheets, etc.

I have now discovered that compounds having the following structural formula represent a class of compounds which are excellent plasticizers for polyvinyl resins and more particularly the acrylonitrile polymers and copolymers:

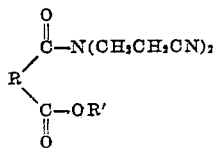

wherein R represents a divalent, aliphatic hydrocarbon radical and R' represents an alkyl radical.

I have also discovered that the plasticizers defined by the structural formula above are compatible with ½ second nitrocellulose, cellulose acetate butyrate, ethyl cellulose, and cellulose acetate.

The plasticizers of my invention impart excellent flexibility characteristics to the final product, and, in addition, the final product does not show cloudiness or exudation, even after several months of aging, but, perhaps the most important advantages in employing my new plasticizer are low volatility, and utility in certain applications requiring flexibility at low temperatures. Thus, additional uses of the new plasticized compositions in cloth coatings, paper coatings, metal coatings, wire coatings, calendered sheets, and molded articles are now possible.

The improved types of plasticized compositions of matter comprising my invention are directed to a polyvinyl resin composition plasticized with an alkyl N,N-bis(2-cyanoethyl) carboxamate, and, more particularly, the novel compositions comprise an acrylonitrile resin plasticized with a compound having the formula:

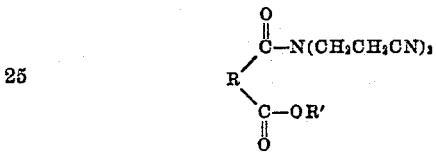

wherein R represents a divalent, aliphatic hydrocarbon radical and R' represents an alkyl radical. A preferred species of my invention is a composition of matter comprising an acrylonitrile copolymer resin plasticized with a compound having the formula:

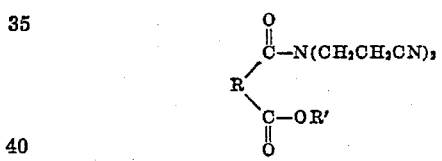

wherein R represents a divalent, aliphatic hydrocarbon radical and R' represents an alkyl radical.

More particularly, the plasticized acrylonitrile copolymer compositions comprising my invention are directed to compositions comprising acrylonitrile-vinyl chloride copolymers plasticized with a compound having the formula:

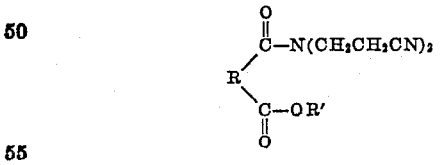

wherein R represents a divalent, aliphatic hydrocarbon radical and R' represents an alkyl radical.

The percentage of vinyl chloride in the acrylonitrile-vinyl chloride copolymer resin can vary within a wide range, usually 0 to 100%, but a preferred range is a composition of a vinyl chloride-acrylonitrile copolymer resin containing an amount of vinyl chloride in the range of from about 25 to 100%. Thus, a further embodiment of my invention comprises a vinyl chloride-acrylonitrile copolymer resin containing an amount of vinyl chloride in the range of from about 25 to 100% plasticized with a compound having the formula:

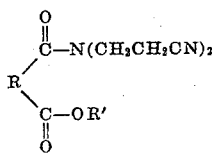

wherein R represents a divalent, aliphatic hydrocarbon radical and R' represents an alkyl radical.

The plasticizers which form a part of my invention may be readily prepared by reacting a cyclic anhydride of a dibasic acid with di(2-cyanoethyl)amine and esterifying the resulting N,N-bis(2-cyanoethyl)carboxamic acids with a suitable alcohol in accordance with the following equations:

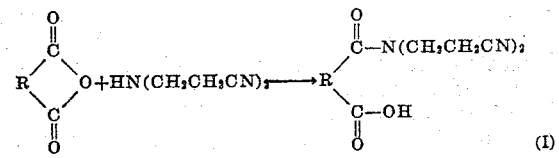

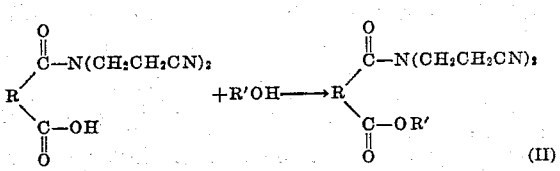

wherein R represents a divalent aliphatic hydrocarbon radicals and R' represents the radical derived from the alcohol in the esterification reaction.

The preferred plasticizers which form a part of this invention include, for example:

Methyl N,N-bis(2-cyanoethyl)succinamate
Ethyl N,N-bis(2-cyanoethyl)succinamate
Butyl N,N-bis(2-cyanoethyl)succinamate
Isopropyl N,N-bis(2-cyanoethyl)succinamate
2-ethylbutyl N,N-bis(2-cyanoethyl)succinamate
2-ethylhexyl N,N-bis(2-cyanoethyl)succinamate
Ethyl N,N-bis(2-cyanoethyl)fumaramate
Allyl N,N-bis(2-cyanoethyl)succinamate
Butyl N,N-bis(2-cyanoethyl)glutaramate Various plasticizers, including many not included in this invention, were tested with the vinyl resins by the use of a simple screening test, i.e., the plasticizers were tested with various resins and those compounds which were observed and found not to impart flexibility to the composition, or that were not compatible with the resin, were screened out. Portions of vinyl resin in acetone were placed into two different beakers. Sufficient plasticizer to be tested was stirred into the solution to give a resin to plasticizer ratio of 1 to 1 in one beaker and 2 to 1 in the other beaker. The mixtures were left to dry overnight. The resulting films or plaques were removed and allowed to air dry for one or two days longer. The two plaques were cut in half and one-half of each plaque was baked for one hour at 300° F., since baking in this manner tends to accentuate incompatibilities. The four plaques were then observed for flexibility, cloudiness and signs of exudation. These ratings were repeated at one week, one month and after three to six months. From these observations each compound was rated as to effectiveness (ability to impart flexibility to the composition) and as to compatibility with the resin (freedom from cloudiness or exudation). More particularly, I have prepared compositions of vinyl chloride-acrylonitrile resin and the plasticizers of my invention and tested them in the manner set forth above.

The fused plaques described above may also be made by forming a plastisol or an organosol rather than casting the plaques from a solution of acetone as described above. The method of preparing the fused plaque does not have any effect on ultimate utility of the plasticized composition.

I have compared the plasticizers of the present invention with some of the plasticizers on the market with samples of various resins in an effort to evaluate the plasticizers for effectiveness and compatibility with the resin. In order to emphasize and point out more clearly the significance of my invention I have prepared tables comparing some of the better plasticizers on the market and the plasticizers of the present invention rating them on their ability to produce flexible compositions with a 60-40 vinyl chloride-acrylonitrile copolymer resin and also rating them on their compatibility with the resin.

Some of the more desirable plasticizers available on the market include:

Di-(2-ethylhexyl) phthalate
Tri-(2-ethylhexyl) phosphate
Triethylene glycol di(2-ethylhexoate)
Polyethylene glycol di(2-ethylhexoate)
2,2'-(2-ethylhexamido)-diethyl-di-(2-ethylhexoate)
Di-(2-ethylhexyl) tetrahydrophthalate
Tetrabutyl thiodisuccinate
Di-(2-ethylhexyl) adipate Other plasticizers available on the open market include plasticizers sold under the trademark "Santicizer" which include:

Santicizer  8 = A mixture of ortho and para toluene ethyl sulfonamides
Santicizer  9 = A mixture of ortho and para toluene sulfonamides
Santicizer 130 = N-isopropyl benzene sulfonamide
Santicizer 131 = Mixed N-isopropyl benzene sulfonamide and N-isopropyl toluene sulfonamide
Santicizer  3 = N-ethyl-p-toluene sulfonamide
Santicizer IH = Cyclohexyl-p-toluene sulfonamide Using an acetone solution, films of 60-40 vinyl chloride-acrylonitrile copolymer resin and the test compound were prepared in the manner described above and then visually examined for:

Rating

Effectiveness _____ 10 = very flexible; 0 = stiff
Compatibility _____ 10 = no cloudiness, no exudation; 8 = slight cloudiness or exudation, etc.

SCREENING TESTS

Table I

| Name | Rating | | Remarks |
|---|---|---|---|
| | Effectiveness | Compatibility | |
| Di-(2-ethylhexyl) phthalate | 1 | 1 | Cloudy—bad sweat out. |
| Tri-(2-ethylhexyl) phosphate | 0 | 0 | Do. |
| Triethylene glycol di(2-ethylhexoate) | 0 | 0 | Do. |
| Polyethylene glycol di(2-ethylhexoate) | 0 | 0 | Do. |
| 2,2'-(2-ethylhexamido)-diethyl-di-(2-ethylhexoate) | 1 | 1 | Do. |
| Di-(2-ethylhexyl) tetrahydrophthalate | 0 | 0 | Do. |
| Tetrabutyl thiodisuccinate | 0 | 3 | Cloudy—not effective. |
| Di-(2-ethylhexyl) adipate | 1 | 0 | Cloudy—bad sweat out. |
| Tri-cresyl Phosphate | 0 | 5 | Not effective. |
| Di-(tetrahydrofurfuryl) phthalate | 9 | 9 | Sweats out on long ageing or exposure to light. |
| "Santicizer 8" | 9 | 10 | Very volatile. |
| "Santicizer 9" | 6 | 6 | Cloudy—not effective. |
| "Santicizer 130" | 9 | 8 | Exudes. |
| "Santicizer 131" | 9 | 8 | Do. |
| "Santicizer 3" | 9 | 7 | Do. |
| "Santicizer IH" | 8 | 10 | Not effective and too volatile. |

SCREENING TESTS

Table II

| Name | Rating - Effectiveness | Rating - Compatibility | Remarks |
|---|---|---|---|
| Methyl N,N-Bis(2-cyanoethyl) succinamate. | 10 | 9 | Slight exudation at 6 mos. at 1/1 ratio. |
| Ethyl N,N-Bis(2-cyanoethyl) succinamate. | 10 | 9+ | Very slight exudation at 6 mos. at 1/1 ratio. |
| Butyl N,N-Bis(2-cyanoethyl) succinamate. | 10 | 10 | A good plasticizer. |
| Isopropyl N,N-Bis(2-cyanoethyl) succinamate. | 9 | 9 | Slight exudation at 6 mos. at 1/1 ratio. |
| 2-ethylbutyl N,N-Bis(2-cyanoethyl) succinamate. | 9 | 9 | Slight exudation at 6 mos. at 1/1 ratio. |
| 2-ethylhexyl N,N-Bis(2-cyanoethyl) succinamate. | 9 | 8 | Effective but exudes. |
| Allyl N,N-Bis(2-cyanoethyl) succinamate. | 10 | 8 | Do. |
| Ethyl N,N-Bis(2-cyanoethyl) fumaramate. | 9 | 8 | Slight exudation and cloudiness. |
| Butyl N,N-Bis(2-cyanoethyl) glutaramate. | 10 | 10 | A good plasticizer. |

I have also prepared samples of various other types of resins and the plasticizer, butyl N,N-bis(2-cyanoethyl)-succinamates, in the manner described above in order to illustrate the compatibility and effectiveness of these new plasticizers with resins other than 60–40 vinyl chloride-acrylonitrile copolymer resin. The manner in which the plasticized compositions were rated is the same as described above.

Table III

| Resin | Rating - Effectiveness | Rating - Compatibility |
|---|---|---|
| Polyvinylacetate | | 10 |
| Polyvinyl butyral | | 5 |
| Vinyl chloride-vinyl acetate—vinyl alcohol resin (91–92% vinyl chloride, 3–4% vinyl-acetate, 5–6% vinyl alcohol) | 10 | 10 |
| Vinyl chloride-vinyl acetate—maleic acid resin (87% vinyl chloride, 12% vinylacetate, 1% maleic acid) | | 9 |
| Ethyl cellulose | | 5 |
| Cellulose acetate butyrate | | 10 |
| Cellulose acetate | | 10 |
| 20% acrylonitrile—79% vinylidene chloride | 10 | 10 |
| 47% acrylonitrile—53% vinylidene chloride | 10+ | 10 |
| 59% acrylonitrile—41% vinylidene chloride | 10– | 7 |
| 40% acrylonitrile—60% vinyl acetate | 10 | 10 |
| 34% acrylonitrile—66% vinyl acetate | 10– | 10– |
| 68% acrylonitrile—32% 2-ethylhexylacrylate | 10 | 7 |
| 26% acrylonitrile—74% styrene | 10 | 10 |

The following Tables IV and V will show the results of compatibility and effectiveness tests on vinyl chloride resins of varying vinyl chloride content when plasticized with butyl N,N-bis(2-cyanoethyl)succinamate.

Samples were made up by adding the plasticizer, butyl N,N-bis(2-cyanoethyl)succinamate, to a solution of resin in such quantities as to give the ratios desired. The mixture was allowed to dry until essentially free of solvent. The resulting plaque was cut in half and one half was baked one hour at 300° F. to insure essentially complete removal of the solvent. Then, both the air dried and baked halves were rated immediately, at one week and at four weeks, for clarity (cl), exudation (exu), and flexi-

Table IV

EFFECT OF VINYL CHLORIDE CONTENT OF RESIN ON PLASTICIZED COMPOSITION

| Percent VCL. | Red. Visc. nsp/.2 | Weeks Aged | 2:1 Resin to Plast. Air Dried | | | 2:1 Resin to Plast. 1 hr. at 300° F. | | | 1:1 Resin to Plast. Air Dried | | | 1:1 Resin to Plast. 1 hr. at 300° F. | | | Rating Co | Rating E |
|---|---|---|---|---|---|---|---|---|---|---|---|---|---|---|---|---|
| | | | Cl | Exu | Flx | Cl | Exu | Flx | Cl | Exu | Flx | Cl | Exu | Flx | | |
| 33.6 | 1.73 DMF | 0 | G | Sl | F+ | G | N | F– | G | B | G– | G | B | G | | |
| | | 1 | G | N | F+ | G | N | F– | G | Sl | G– | G | B | G | | |
| | | 4 | G | N | F | G | N | F | G | Sl | G | G | VSl | G | 6 | 9 |
| 44.0 | 1.64 | 0 | | | | | | | G | Sl | G | G | B | G | | |
| | | 1 | | | | | | | G | N | G | G | B | G | | |
| | | 4 | | | | | | | G | VSl | G | G | B | G | 6 | 10 |
| 45 | 1.14 | 0 | G | VSl | G | G | N | G | G | N | G | G | B | G | | |
| | | 1 | G | N | G | G | N | G | G | N | G | G | B | G | | |
| | | 4 | G | N | G | G | N | G | G | N | G | G | B | G | 7– | 10 |
| 50.7 | 1.08 | 0 | | | | | | | G | N | G | G | B | G | | |
| | | 6 | | | | | | | G | B | G | G | B | G | 7 | 10 |
| 51.1 | 2.06 | 0 | | | | | | | G | Sl | G | G | B | G | | |
| | | 6 | | | | | | | G | N | G | G | Sl | G | 8 | 10 |
| 53.1 | 2.75 | 0 | | | | | | | G | N | G | G | N | G | | |
| | | 4 | | | | | | | G | N | G | G | Sl | G | 9 | 10 |
| | | 15 | | | | | | | G | N | G | G | N | G | | |
| 58.9 | 1.35 | 0 | | | | | | | G | N | G | G | N | G | | |
| | | 1 | | | | | | | G | N | G | G | N | G | | |
| | | 4 | | | | | | | G | N | G | G | VSl | G | 10– | 10 |
| | | 15 | | | | | | | G | N | G | G | N | G | | |
| 61.1 | 1.23 | 0 | | | | | | | G | N | G | G | N | G | | |
| | | 1 | | | | | | | G | N | G | G | N | G | | |
| | | 4 | | | | | | | G | N | G | G | N | G | 10 | 10 |
| | | 15 | | | | | | | G | N | G | G | N | G | | |
| 61.1 | 1.23 | 0 | G | N | G | G– | N | G– | G | N | G | G– | N | G | | |
| | | 1 | G | N | G | G– | N | G– | G | N | G | G– | N | G | | |
| | | 4 | G | N | G | G– | Sl | G– | G | N | G | G– | N | G | 10 | 10 |
| 61.1 | 1.23 | 0 | G | N | G | G | N | P | G | N | G | G | N | G | | |
| | | 1 | G | N | G | G | N | P | G | N | G | G | N | G | | |
| | | 4 | G | N | G | G | Sl | P | G | N | G | G | N | G | 10 | 10 |
| 61.1 | 1.23 | 0 | G | N | G | G | N | G | G | N | G | G | N | G | | |
| | | 1 | G | N | G | G | N | G | G | N | G | G | N | G | | |
| | | 4 | G | N | G | G | N | G | G | N | G | G | N | G | 10 | 10 |
| 80.1 | 0.62 | 0 | | | | | | | G | N | G | G | N | G | | |
| | | 1 | | | | | | | G | N | G | G | N | G | | |
| | | 5 | | | | | | | G | N | G | G | Sl | G | 10– | 10 |
| 85.3 | 0.59 | 0 | | | | | | | F | N | G | F | N | G | | |
| | | 1 | | | | | | | G | N | G | F | N | G | | |
| | | 4 | | | | | | | G | N | G | F | B | G | | |
| | | 15 | | | | | | | F | N | G | F | B | G | 9 | 10 |
| 94 | 1.58 CH | 0 | P | Sl | G | P | Sl | F | P | B | G | P | B | G | | |
| | | 1 | P | Sl | G | P | N | F | P | B | G | P | B | G | | |
| | | 4 | P | N | B | G | P | Sl | F | P | B | G | P | B | G | 5 | 9 | bility (flx). Ratings used were good (G), fair (F), and poor (P) for clarity and flexibility, whereas the exudation was rated as none (N), slight (Sl), moderate (M), and bad (B). Finally, the data were reviewed and each combination of resin and plasticizer was rated as to compatibility (Co) and effectiveness (E) or plasticizing action. The rating basis was 10=good, 0=poor.

and effectiveness tests with resins of high vinyl chloride content.

The resins were used as solutions in cyclohexanone, (CH), acetone or dimethylformamide (DMF), with the high chloride resins (85–100%) usually dissolved in cyclohexanone, the medium chloride resins (50–85%) usually dissolved in acetone and the lower chloride resins dissolved in dimethylformamide.

*Table V*

EFFECT OF VINYL CHLORIDE CONTENT OF RESIN ON PLASTICIZED COMPOSITION

| Percent VCL. | Red. Visc. nsp/.2 | Weeks Aged | 4:1 Resin to Plast. | | | | | | 1:1 Resin to Plast. | | | | | | Rating | |
|---|---|---|---|---|---|---|---|---|---|---|---|---|---|---|---|---|
| | | | Air Dried | | | 1 hr. at 300° F. | | | Air Dried | | | 1 hr. at 300° F. | | | | |
| | | | Cl | Exu | Flx | Cl | Exu | Flx | Cl | Exu | Flx | Cl | Exu | Flx | Co | E |
| 98.8 | 1.41 NB | 0 | G | B | G | G | B | G | G | B | G | G | B | G | | |
| | | 1 | G | B | G | G | B | G | G | B | G | G | B | G | | |
| | | 4 | G | B | G | G | B | G | G | B | G | G | B | G | 6 | 9 |
| 100 | 0.98 NB | 0 | G | B | G | G | B | G | G | B | G | G | B | G | | |
| | | 1 | G | B | G | G | B | F | G | B | G | G | B | G | | |
| | | 4 | G | B | G | G | B | F | G | B | G | G | B | G | 6 | 9 |

All of the resins used in Table IV are copolymers of vinyl chloride and acrylonitrile made usually by emulsion polymerization, whereas Table V illustrates compatibility The following Table VI shows a comparison of various alkyl N,N-bis(2-cyanoethyl)succinamates in compositions of various vinyl chloride and acrylonitrile contents, as to their effectiveness and compatibility:

*Table VI*

| Wks. Aged | 4 to 1 Resin to Plast. | | | | | | 2 to 1 Resin to Plast. | | | | | | 1 to 1 Resin to Plast. | | | | | | Rating | |
|---|---|---|---|---|---|---|---|---|---|---|---|---|---|---|---|---|---|---|---|---|
| | Air Dried | | | 1 hr. at 300° F. | | | Air Dried | | | 1 hr. at 300° F. | | | Air Dried | | | 1 hr. at 300° F. | | | | |
| | Cl | Exu | Flx | Cl | Exu | Flx | Cl | Exu | Flx | Cl | Exu | Flx | Cl | Exu | Flx | Cl | Exu | Flx | Co | E |

Resin: 32% vinyl chloride. Plasticizer: Methyl N,N-bis(2-cyanoethyl) succinamate

| 0 | G | N | G | G | N | G | | | | | | | G | N | G | G | N | G | | |
| 1 | G | Sl | G | G | N | N | | | | | | | G | N | G | G | N | G | | |
| 4 | G | N | G | G | N | G | | | | | | | G | N | G | G | B | G | 9 | 10 |

Resin: 45% Vinyl Chloride. Plasticizer: Methyl N,N-bis (2-cyanoethyl) succinamate

| 0 | G | N | G | G | N | G | | | | | | | G | N | G | G | N | G | | |
| 1 | G | N | G | G | N | G | | | | | | | G | N | G | G | N | G | | |
| 4 | G | N | G | G | N | G | | | | | | | G | N | G | G | N | G | 10 | 10 |

Resin: 94% Vinyl Chloride. Plasticizer: Methyl N,N-bis(2-cyanoethyl) succinamate

| 0 | P | B | G | P | B | F | | | | | | | P | B | G | P | B | F− | | |
| 1 | P | B | G | G | B | F | | | | | | | P | B | G | P | B | F− | | |
| 4 | P | B | G | P | B | F | | | | | | | P | B | G | P | B | P | 1 | 2 |

Resin: 100% Vinyl Chloride. Plasticizer: Methyl N,N-bis(2-cyanoethyl) succinamate

| 0 | P | B | G | P | B | F | | | | | | | P | B | G | P | B | P | | |
| 1 | P | B | G | G | B | F | | | | | | | P | B | G | P | B | P | | |
| 4 | G | B | G | P | B | P | | | | | | | P | B | G | P | B | P | 2 | 2 |

Resin: 100% Vinyl Chloride. Plasticizer: 2-Ethylhexyl N,N-bis(2-cyanoethyl) succinamate

| 0 | G | N | G | G | Sl | G− | G | N | G | G | Sl | G | G | N | G | G | Sl | G | | |
| 1 | G | N | G | G | N | F | G | N | G | G | Sl | F | G | Sl | G | G | Sl | G | | |
| 4 | G | Sl | G | G | N | F | G | N | G | G | B | G | G | B | G | G | B | G | 8 | 9 |

Resin: Polyacrylonitrile. Plasticizer: Methyl N,N-bis(2-cyanoethyl) succinamate (10 to 1)

| 0 | G | B | F | G | N | P | G | G | F | G | G | P | G | G | P | G | G | P | | |
| 1 | G | G | P | G | G | P | G | G | P | G | G | P | G | G | P | G | G | P | 8 | 0 |

As can be seen from the above Tables V and VI, the alkyl esters of N,N-bis-(2-cyanoethyl)succinamic acids are compatible with polyvinyl resins of 0–100% vinyl chloride. More particularly, it can be readily seen that the particular alkyl succinamates are compatible with vinylchloride-acrylonitrile resins of 0 to 100% vinyl chloride.

The following Tables VII and VIII will show the results of tests of various acrylonitrile containing resins with a butyl N,N-bis(2-cyanoethyl)succinamate plasticizer in selected ratios of resin to plasticizer.

Table VII

EFFECT OF ACRYLONITRILE CONTENT ON PLASTICIZED COMPOSITION

| Wks. Aged | 4 to 1 Resin to Plast. | | | | | | 2 to 1 Resin to Plast. | | | | | | Rating | |
|---|---|---|---|---|---|---|---|---|---|---|---|---|---|---|
| | Air Dried | | | 1 hr. at 300° F. | | | Air Dried | | | 1 hr. at 300° F. | | | | |
| | Cl | Exu | Flx | Cl | Exu | Flx | Cl | Exu | Flx | Cl | Exu | Flx | Co | E |

Resin: Copolymer of vinylidene chloride (79%) and acrylonitrile, used at 20% in methyl ethyl ketone.

| 0 | G | N | G | F | N | G | P | N | G | P | N | G | | |
| 1 | G | N | G | F | N | G | P | N | G | P | N | G | | |
| 4 | G | N | G | F | N | G | P | N | G | P | N | G | 10 | 10 |

Resin: A consecutive polymer of vinyl acetate on acrylonitrile, 40% acrylonitrile, nsp/.2=1265 in dimethylformamide, used at 10% in toluene.

| 0 | G | Sl | G | G | N | G | P | N | G | | | | | |
| 1 | G | N | G | G | N | G | | | | | | | | |
| 4 | G | N | G | G | N | G | G | N | G | | | | 10 | 10 |

Resin: A copolymer of vinyl acetate and acrylonitrile (34.4%), 1.170 nsp/.2 in dimethylformamide used at 10% in dimethylformamide.

| 0 | P | N | G | P | N | G– | P | N | G | P | N | G | | |
| 1 | P | N | G | P | N | G– | P | N | G | P | N | G | | |
| 4 | P | N | G | P | N | G– | P | N | G | P | N | G | 10– | 10– |

Resin: Copolymer of acrylonitrile and styrene (26–27%) acrylonitrile, used at 20% in acetone.

| 0 | G | N | G | G | N | P | | | | | | | | |
| 1 | G | N | G | G | N | P | | | | | | | | |
| 4 | G | N | G | G | N | P | | | | | | | | |
| 9 | G | N | P | G | N | P | | | | | | | 10 | 10 |

Table VIII

EFFECT OF ACRYLONITRILE CONTENT ON PLASTICIZED COMPOSITION

| Wks. Aged | 2:1 Resin to Plast. | | | | | | 1:1 Resin to Plast. | | | | | | Rating | |
|---|---|---|---|---|---|---|---|---|---|---|---|---|---|---|
| | Air Dried | | | 1 hr. at 300° F. | | | Air Dried | | | 1 hr. at 300° F. | | | | |
| | Cl | Exu | Flx | Cl | Exu | Flx | Cl | Exu | Flx | Cl | Exu | Flx | Co | E |

Resin: Copolymer of vinylidene chloride (53.4%) and acrylonitrile, 1.73 nsp/.2 in cyclohexanone used at 10% in dimethylformamide.

| 0 | G | N | G | G | N | G | G | N | G | G | N | G | | |
| 1 | G | N | G | G | N | G | G | N | G | G | N | G | | |
| 4 | G | N | G | G | N | G | G | N | G | G | N | G | 10 | 10+ |

Resin: Copolymer of vinylidene chloride (40.8%) and acrylonitrile, 1.91 nsp/.2 in dimethylformamide, used at 15% in dimethylformamide.

| 0 | G | N | G– | G | B | G– | G | N | G | G | B | G | | |
| 1 | G | N | G– | G | Sl | G– | G | N | G | G | Sl | G | | |
| 4 | G | N | G– | G | B | G– | G | N | G | G | Sl | G | 7 | 10– |

The nature and the proportion of plasticizer used in a given composition naturally will affect the physical properties of the composition, for example, the flexibility, amount of cloudiness and exudation, the chemical, mechanical, and electrical resistivities. I have found that the compatibility of compositions of resin and plasticizer is not substantially affected when a ratio of resin to plasticizer of 1:1 is used. Naturally the type of plasticizer used will have some effect on the compatibility but in general ratios of resin to plasticizer of 1:1 to 2:1 and even as high as 10:1 have proved entirely satisfactory. A preferred range of the plasticizer to the resin is an amount of plasticizer of from about 5 to 60% by weight, based on the total composition.

A further embodiment of my invention comprises a vinyl chloride-acrylonitrile copolymer resin containing an amount, of from about 5% to 60% by weight, based on the total composition, of a plasticizer having the formula:

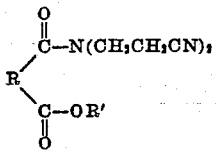

wherein R represents a divalent, aliphatic hydrocarbon radical and R' represents an alkyl radical.

A specific embodiment of my invention comprises compositions consisting of vinyl chloride-acrylonitrile copolymer resins having a vinyl chloride content in the range of from about 25 to 100% and containing an amount of from about 5% to 60% by weight, based on the total composition, of a plasticizer having the formula:

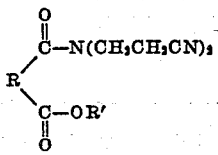

wherein R represents a divalent, aliphatic hydrocarbon radical and R' represents an alkyl radical.

The invention also contemplates the use of other modifying ingredients such as pigments, fillers, or other compatible resins or plasticizers. With the addition of the proper pigments and fillers compositions of this nature would be suitable for cable sheathing, upholstery, wire insulation and the like.

The following examples will serve to illustrate the practice of the invention:

EXAMPLE I

Butyl N,N-bis(2-cyanoethyl)succinamate and a plastisol grade vinyl chloride-acrylonitrile resin, containing 63.1% vinyl chloride and having a reduced viscosity in cyclohexanone of 1.33, were mixed together in a ratio of resin to plasticizer of 1:1. After milling one pass on a three roll mill a viscous plastisol was obtained. The viscosity, as measured with a Brookfield viscosimeter at 6 r.p.m. with the #4 spindle at 27° C., was initially 18,000 centipoises and at the end of seven days was 31,000 centipoises. At the end of four weeks the viscosity was 50,500 centipoises.

A 40 gram portion was weighed into a beaker, deaerated by placing the beaker in a vacuum chamber, and then baked 20 minutes at 325° C. A tough flexible plaque was obtained.

EXAMPLE II

Physical properties of plastisol plaques and films

Other batches of plastisol were prepared as in Example I. A portion was poured in a crystallizing dish, deaerated, and baked 20 minutes at 325° C. to give a tough, flexible sheet about 0.075 inch thick. Thin films of about 0.004 inch thick were also prepared from other portions of the plastisol by deaerating in a vacuum, casting on glass slides and baking for ten minutes at temperatures ranging from 175° F. to 400° F. The thin films were quite strong and flexible. The following properties were determined on the thin films:

| Baking Temp., °F. | Tensile Strength p.s.i.[1] | Percent Elongation at Break [1] | Percent Water Extraction [2] | Percent Oil Extraction [3] | Volatility [4] |
|---|---|---|---|---|---|
| 175 | 800 | 125 | | | |
| 200 | 1300 | 215 | | | |
| 225 | 1600 | 275 | | | |
| 250 | 1940 | 360 | | | |
| 275 | 1740 | 308 | | | |
| 300 | 2340 | 443 | | | |
| 350 | 2060 | 403 | 38.3 | 3.2 | 2.6 |
| 400 | 2120 | 306 | | | |

[1] As measured with a Scott IP-4 Seriograph.
[2] Loss after 10 days immersion at 25° C., water changed every day.
[3] Loss after 10 days immersion in mineral oil at 25° C., oil changed every day.
[4] Loss in 24 hours at 70° C., samples surrounded with activated carbon.

From the above figures it will be seen that the films had good tensile-elongation properties, good resistance to oil extraction, low volatility and fair resistance to water extraction.

Pieces from the 0.075 inch plaque were fluxed together on a two roll mill for five minutes at 190° C. and pressed at 140° C. and 1500 p.s.i. to give a tough, flexible sheet. The physical properties of this milled sheet, and of the plastisol plaque, were also determined with the following results:

| | Plastisol Plaque | Milled Sheet |
|---|---|---|
| Tensile Strength, p.s.i. | 1825 | 1950 |
| Elongation, Percent | 280 | 360 |
| Load at 100% Elongation, p.s.i. | 825 | 600 |
| ASTM Stiffness Modulus, p.s.i. | 270 | 320 |
| Flex Temperature (T$_F$), °C. | −23 | −22 |
| T$_4$, °C. (tortional stiffness at 10,000 p.s.i.) | −4 | −3 |
| Shore Hardness ("A") | 59 | 52 |

From the figures shown above it can be seen that these sheets have good mechanical properties and fair low temperature characteristics.

EXAMPLE III

Plasticized film cast from solution

The following solutions were prepared:

| Solution | A | B | C |
|---|---|---|---|
| Vinyl chloride-acrylonitrile resin (60–40 vinyl chloride-acrylonitrile) | 20 | 20 | 20 |
| Acetone | 40 | 40 | 40 |
| Cyclohexanone | 40 | 40 | 40 |
| Butyl N,N-bis(2-cyanoethyl) succinamate | | 5 | 10 |
| Total parts by weight | 100 | 105 | 110 |

Films were cast and allowed to air dry. After force drying at 200° F. to remove residual solvent clear, strong, tough, flexible films were obtained. The physical properties of the films were:

| Film from solution | A | B | C |
|---|---|---|---|
| Percent plasticizer on resin basis | 0 | 25 | 50 |
| Mils thickness | 2.4 | 2.9 | 2.9 |
| Avg. Elongation, Percent | 6 | 27 | 176 |
| Avg. Tensile Strength, p.s.i. | 9,640 | 6,220 | 3,840 |

EXAMPLE IV

Plasticized organosols

The following mixtures were ground in a one quart pebble mill, containing 770 grams of ½" to ¾" diameter flint pebbles, and rotating at 82 r.p.m.:

| | | | | | | |
|---|---|---|---|---|---|---|
| Percent Plasticizer on resin basis | 50 | 50 | 50 | 50 | 50 | 0 |
| Percent Ketone in thinner | 35 | 40 | 45 | 50 | 55 | 55 |
| Percent Resin | 35 | 35 | 35 | 35 | 35 | 35 |
| A vinyl chloride-acrylonitrile copolymer resin containing 60% vinyl chloride and 40% acrylonitrile | 105 | 105 | ¹ 105 | 105 | 105 | 87.5 |
| Butyl N,N-bis (2-cyanoethyl) succinamate | 52.5 | 52.5 | 52.5 | 52.5 | 52.5 | |
| Isophorone | 49.9 | 57 | 64.2 | 71.2 | 78.3 | 89.3 |
| Xylene | 92.6 | 85.5 | 78.3 | 71.3 | 64.2 | 73.2 |
| Total Wt. (gms.) | 300.0 | 300.0 | 300.0 | 300.0 | 300.0 | 300.0 |
| Hours ground | 72 | 72 | 72 | 72 | 72 | 48 |
| Viscosity, centistokes #2 Parlin Cup | 4,700 | 610 | 590 | 630 | 800 | 200 |

¹ = optimum composition.

Films were cast at 10 mils wet thickness on glass slides and baked 10 minutes at 350° F. Clear, strong films were obtained from all of the organosols and all but the last one were quite flexible.

Physical properties on the plasticized film from the optimum composition and from the unplasticized film were:

| | Percent Plasticizer on a vinyl chloride-acrylonitrile copolymer resin containing 60% vinyl chloride and 40% acrylonitrile | Avg. Thickness | Percent Elongation | Tensile Strength (p.s.i.) |
|---|---|---|---|---|
| Unplasticized Film | 0 | 1.5 | 8 | 10,466 |
| Film of Optimum Composition | 50 | 2.0 | 227 | 4,100 |

Thus it can be seen that the plasticizers can be incorporated into the standard organosols with the resulting increase in the flexibility of the films produced.

EXAMPLE V

Properties of plasticized organosol films

Organosol films containing varying amounts of butyl N,N-bis(2-cyanoethyl)succinamate were prepared by casting the organosol on glass slides and baking for 10 minutes at 350° F. Tensile and elongation data were obtained as follows:

| Percent plasticizer on a a vinyl chloride-acrylonitrile copolymer resin containing 60% vinyl chloride and 40% acrylonitrile basis | 100 | 50 | 25 | 10 | 0 |
|---|---|---|---|---|---|
| Thickness, mils | 2.5 | 1.8 | 1.6 | 1.7 | 1.7 |
| Percent elongation | 382 | 292 | 20 | 6.4 | 11 |
| Tensile Strength | 1,766 | 3,933 | 6,890 | 11,040 | 11,922 |

It was further observed that the first film containing 100% plasticizer based on the resin weight, was very pliable and even showed rubber-like elasticity, described as "snapback" and yet showed no sign of exudation.

EXAMPLE VI

A sample of butyl N,N-bis(2-cyanoethyl)succinamate was mixed in three concentrations, 35%, 40% and 45% by weight of total compound, with a vinyl chloride-acrylonitrile copolymer resin containing 60% vinyl chloride and 40% acrylonitrile and the resulting mixtures fluxed on a two-roll mill at 135° C. Transparent flexible sheets, free of any indication of incompatibility, were obtained in each case. Samples from the milled sheets were compression molded into suitable test plaques at 150° C. The physical properties of the plaques were as follows:

| | | | |
|---|---|---|---|
| Percent Plasticizer by weight | 35 | 40 | 45 |
| Tensile strength, p.s.i. | 3,650 | 3,200 | 2,800 |
| Elongation, Percent | 275 | 290 | 350 |
| Load at 100% elongation, p.s.i. | 2,450 | 1,650 | 1,000 |
| ASTM Stiffness modulus, p.s.i. | 3,600 | 1,000 | 430 |
| $T_4$° C. (tortional stiffness of 10,000 p.s.i.) | +21 | +13.5 | +4 |
| Flex Temperature ($T_F$) ° C | +4 | −4.5 | −9.5 |
| Brittle Temperature, ° C | +2 | −4 | −11 |
| Shore hardness | 83 | 67 | 57 |
| Percent Extraction: | | | |
| Oil | 1.2 | 2.0 | 2.5 |
| Water | 7.7 | 14.7 | 19.4 |
| SPI Volatile loss in 24 hrs. at 70° C | 1.3 | 1.5 | 1.5 |

Each composition contained 0.5% (on weight of total compound) of an organo-tin heat-stabilizer.

With the addition of the proper pigments, fillers, etc., compositions of this general range of flexibility would be suitable for cable sheathing, upholstery and wire insulation.

EXAMPLE VII

Two samples of plasticized compositions were prepared by mixing dry resin "Vinyon" N, the plasticizer described in Example VI and an organo-tin stabilizer and fluxed on a two-roll mill at 130° C. Transparent, dry sheets were obtained in each case. On the basis of an arbitrary criterion (a modulus of 1000 p.s.i. at 100% elongation) for a desired degree of room-temperature flexibility, the two samples performed as follows:

| Sample | 1 | 2 |
|---|---|---|
| Percent by weight in "Vinyon" N resin | 44.2 | 41.4 |
| Tensile strength, p.s.i. | 2,350 | 2,570 |
| Elongation, Percent | 325 | 335 |
| Load at 100 percent elongation, p.s.i. | 1,000 | 1,000 |
| ASTM Stiffness modulus, p.s.i. | 575 | 750 |
| $T_F$, ° C. (Flex temperature) | −18 | −15 |
| $T_4$, ° C. (Tortional stiffness of 10,000 p.s.i. | +4.5 | +6.5 |
| Brittle temperature, ° C | −10 | −7 |
| Shore hardness | 68 | 71 |
| SPI Volatile loss, percent | 1.6 | 1.5 |
| Percent Extraction: | | |
| Oil | 2.0 | 14.7 |
| Water | 22.0 | 48 |

EXAMPLE VIII

A plastisol plaque and a thin film, each based on equal parts of "Vinyon" N resin and 2-ethylbutyl N,N-bis(2-cyanoethyl) succinamate and prepared in the manner of Example I, had the following physical properties:

Tensile strength, p.s.i. _____ 1,775
Elongation, percent _____ 325
Load at 100% elongation, p.s.i. _____ 950
ASTM Stiffness modulus, p.s.i. _____ 240
$T_F$, ° C. (Flex temperature) _____ −27.5
$F_4$, ° C. (Tortional stiffness of 10,000 p.s.i.) ___ −3
Brittle temperature, ° C. _____ −3
Shore hardness _____ 63
SPI Volatile loss, percent _____ 6.5
Sweat out _____ None

What is claimed is:

1. A polymerized vinyl chloride resin composition, containing at least 25 percent vinyl chloride polymerized therein, plasticized with a compound having the formula:

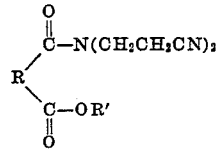

wherein R represents a divalent, aliphatic hydrocarbon radical and R' represents an alkyl radical containing from 1 through 8 carbon atoms.

2. A composition of matter comprising an acrylonitrile-vinyl chloride copolymer resin, containing at least 25 percent vinyl chloride polymerized therein, plasticized with methyl N,N-bis(2-cyanoethyl)succinamate.

3. A composition of matter comprising an acrylonitrile-vinyl chloride copolymer resin, containing at least 25 percent vinyl chloride polymerized therein, plasticized with butyl N,N-bis(2-cyanoethyl) succinamate.

4. A composition of matter comprising an acrylonitrile-vinyl chloride copolymer resin, containing at least 25 percent vinyl chloride polymerized therein, plasticized with 2-ethylhexyl N,N-bis(2-cyanoethyl) succinamate.

5. A composition of matter comprising an acrylonitrile-vinyl chloride copolymer resin containing at least 25 percent vinyl chloride polymerized therein, plasticized with butyl N,N-bis(2-cyanoethyl) glutaramate.

6. A composition of matter comprising a vinyl chloride-acrylonitrile copolymer resin containing at least 25 percent vinyl chloride polymerized therein, plasticized with a compound having the formula:

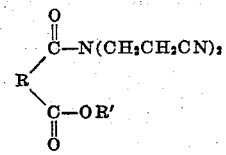

wherein R represents a divalent, aliphatic hydrocarbon radical and R' represents an alykyl radical containing from 1 through 8 carbon atoms.

7. A composition of matter comprising a vinyl chloride-acrylonitrile copolymer resin having a vinyl chloride content of at least 25 percent polymerized therein, and containing an amount of from about 5 percent to 60 percent by weight, based on the total composition, of a plasticizer having the formula:

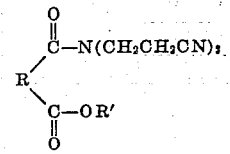

wherein R represents a divalent aliphatic hydrocarbon radical and R' represents an alkyl radical containing from 1 through 8 carbon atoms.

8. A composition of matter comprising a vinyl chloride-acrylonitrile copoylmer resin having a vinyl chloride content in the range of from about 50 percent to 75 percent polymerized therein and containing an amount of from about 5 percent to 60 percent by weight, based on the total composition, of butyl N,N-bis(2-cyanoethyl) succinamate as a plasticizer.

9. A composition of matter comprising a vinyl chloride-acrylonitrile copolymer resin having a vinyl chloride content in the range of from about 50 percent to 75 percent polymerized therein and containing an amount of from about 5 percent to 60 percent by weight, based on the total composition, of butyl N,N-bis(2-cyanoethyl) glutaramate as a plasticizer.

References Cited in the file of this patent
UNITED STATES PATENTS

| | | |
|---|---|---|
| 2,426,728 | D'Alelio | Sept. 2, 1947 |
| 2,750,401 | Lynn | June 12, 1956 |
| 2,790,820 | Lynn | Apr. 30, 1957 |